United States Patent [19]
Fujii

[11] 3,713,369
[45] Jan. 30, 1973

[54] METER COMPENSATION FOR A CAMERA WITH INTERCHANGEABLE LENSES AND FOCUSSING SCREENS

[75] Inventor: Tatsuo Fujii, Tokyo, Japan
[73] Assignee: Nippon Kogaku K.K., Tokyo, Japan
[22] Filed: Nov. 9, 1970
[21] Appl. No.: 87,940

[30] Foreign Application Priority Data
Nov. 8, 1969  Japan....................44/89062

[52] U.S. Cl. .....................95/10 C, 95/64 R
[51] Int. Cl.........G03b 7/04, G03b 19/12, G01j 1/56
[58] Field of Search.................95/42, 44 R, 44 B

[56] References Cited

UNITED STATES PATENTS

| | | | |
|---|---|---|---|
| 3,498,198 | 3/1970 | Fujii | 95/42 |
| 3,439,600 | 4/1969 | Suzuki | 95/44 |
| 3,460,451 | 8/1969 | Starp | 95/10 CT |
| 3,608,450 | 9/1971 | Shimomura | 95/42 X |
| 3,421,421 | 1/1969 | Hahn | 95/10 |
| 3,176,599 | 4/1965 | Anwyl | 95/10 |

Primary Examiner—John M. Horan
Assistant Examiner—Michael Harris
Attorney—Ward, McElhannon, Brooks & Fitzpatrick

[57] ABSTRACT

A single-lens reflex camera including an interchangeable focusing screen, each screen having an individually positioned electrical contact, an interchangeable lens, each lens having an individually positioned electrical contact, an exposure measuring device which measures the intensity of the light passing through the lens and focusing screen; a circuit system in the exposure measuring device having terminals for receiving the electrical contacts on the mounting portion of the camera body for automatically correcting the amount of exposure meter sensitivity represented by the resistance value of a particular resistor for a particular combination of focusing screen and lens, when such focusing screen and lens are mounted on the camera body.

3 Claims, 15 Drawing Figures

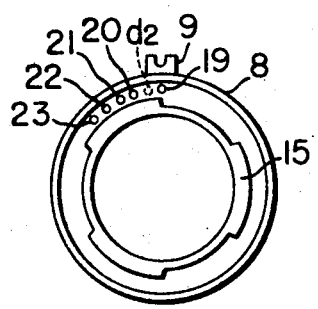
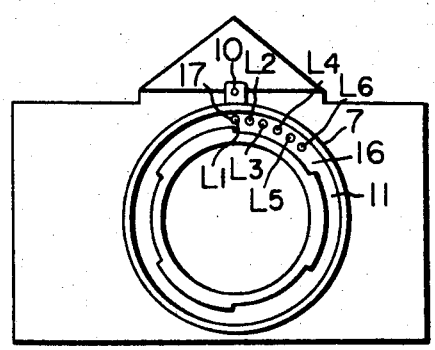
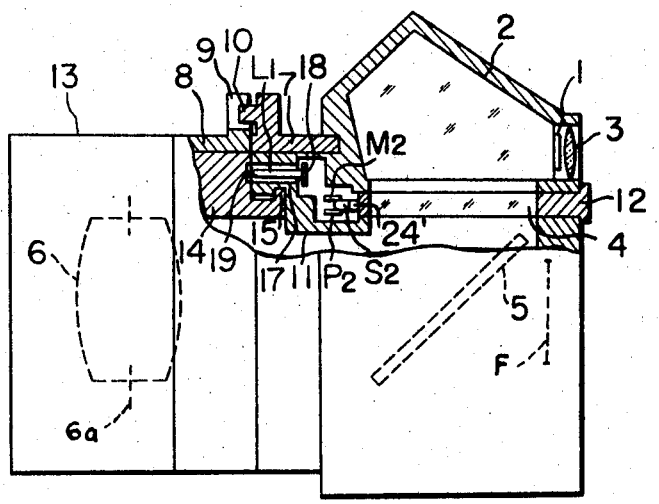
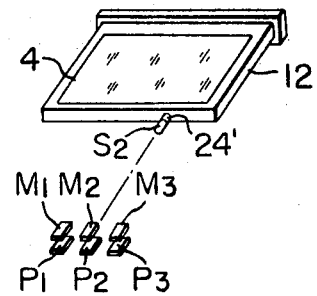

METER COMPENSATION FOR A CAMERA WITH INTERCHANGEABLE LENSES AND FOCUSSING SCREENS

BACKGROUND OF THE INVENTION

1. Field of the Invention

This invention relates to a camera provided with a correction device in which light transmitted from an object through an objective lens is received by the light receiving portion of a photo-responsive circuit represented by an exposure meter circuit and a so-called electronic shutter circuit determining a shutter time by electric action so that the intensity of that incident light is converted into an electrical variable which controls electrically actuated means such as meter or magnet. More particularly, the present invention relates to a camera in which the quantitative error of the light incident on the said light receiving portion is corrected in the said photo-responsive circuit.

2. Description of the Prior Art

In cameras of the described type, it is generally desirable that the light receiving surface of a photo-responsive element in the said light receiving portion is disposed on the focal plane of an objective lens or, in a single-lens reflex camera, on a finder focusing plate which is conjugate to the said focal plane. However, in these planes, where there is already present a film or a focusing plate, it is structurally difficult to additionally provide a photo-responsive element. For this reason, it has usually been the practice that a photo-responsive element is disposed either before or behind such focal plane or a conjugate plane to the focal plane.

Nevertheless, in an interchangeable lens type camera, if the light receiving surface of the photo-responsive element is not in accord with the focal plane or the conjugate plane to the focal plane and various interchangeable photographic lenses have different exit pupil positions, then the ratio of the distance between the exit pupil and the light receiving surface to the distance between the exit pupil and the focal plane differs from lens to lens, and even though the lenses have the same aperture ratio, the angle of field at the light receiving surface (namely, angle of elevation from the light receiving surface to the edge of the exit pupil) also differs from lens to lens, thus varying the amount of light incident upon the light receiving surface. Such variation may result partly in a quantitative error of the light incident upon the light receiving surface. This is the case with a camera having the so-called full open photometric system whereby photoelectric conversion is effected with the photographing lens keeping its maximum aperture, as well as with a camera having the so-called stop-down photometric system whereby photoelectric conversion is effected with the aperture ratio maintained at the level for photography.

In the camera of the former type, if the lenses mounted thereon differ in maximum aperture ratio, their angles of field at the light receiving surface also differ even though the light receiving surface is in accord with the focal plane or, in case where the light receiving surface is not in accord with the focal plane but the lenses have the same exit pupil position, and thus the amount of light incident on the light receiving surface is varied. Such variation may also result in a quantitative error of the incident light.

Also, in other cameras such as single-lens reflex camera having a focusing plate and a system whereby light transmitted from an object through a photographing lens and the focusing plate is received by the light receiving portion of a photo-responsive circuit so that the intensity of that light is derived as an electrical variation, and if the focusing plate is interchangeable, various factors such as different dimensions of the mat surface of an interchanged focusing plate and its different diffusion coefficient, or the presence of a split prism or a micro-prism and the area occupied by such prism on the focusing plate may also result in a quantitative variation of the light incident on the light receiving surface and accordingly in a quantitative error of such incident light.

Further, in a camera of the type in which the light receiving surface is not in accord with the focal plane and photographing lenses of different aperture ratios and focusing plates of different patterns are interchangeable, there occurs a combined error consisting of the errors resulting from the above-described various reasons.

In the field of exposure meter, for example, it is known to correct such errors by the correction techniques for interchangeable lenses having different maximum aperture ratios or different exit pupil positions. These techniques utilize the conventional exposure meter circuit, and accordingly utilize mechanical correction means, which has led to an intricacy of the mechanism and an increase in number of parts, which in turn has led to an increased likelihood of causing failure or trouble as well as to a great space required for accommodating the intricate mechanism and to cumbersomeness of the correcting operation.

SUMMARY OF THE INVENTION

It is therefore a primary object of the present invention to provide a camera provided with a correction device for correcting any quantitative error of light incident on a light receiving surface resulting from the above-noted various reasons and which device is simple in structure and operation and only occupies a small space, and particularly to provide a camera provided with a correction device of the type which permits a necessary correction circuit to be preincorporated in the body of the camera so as to automatically correct said error upon mounting of an objective lens, a focusing plate and the like on the camera.

Other objects and features of the present invention will become fully apparent from the following detailed description of various embodiments thereof taken in conjunction with the accompanying drawings.

BRIEF DESCRIPTION OF THE DRAWINGS

FIG. 5 is a rear view of the lens mount portion of the camera.

FIG. 6 is a front view of the camera body.

FIG. 7 is a side view, partly in cross section, of the camera body with a lens and a focusing plate mounted thereon.

FIG. 8 is a perspective view for illustrating the relationship between the focusing plate and the contacts.

DESCRIPTION OF THE PREFERRED EMBODIMENTS

Figure 1:
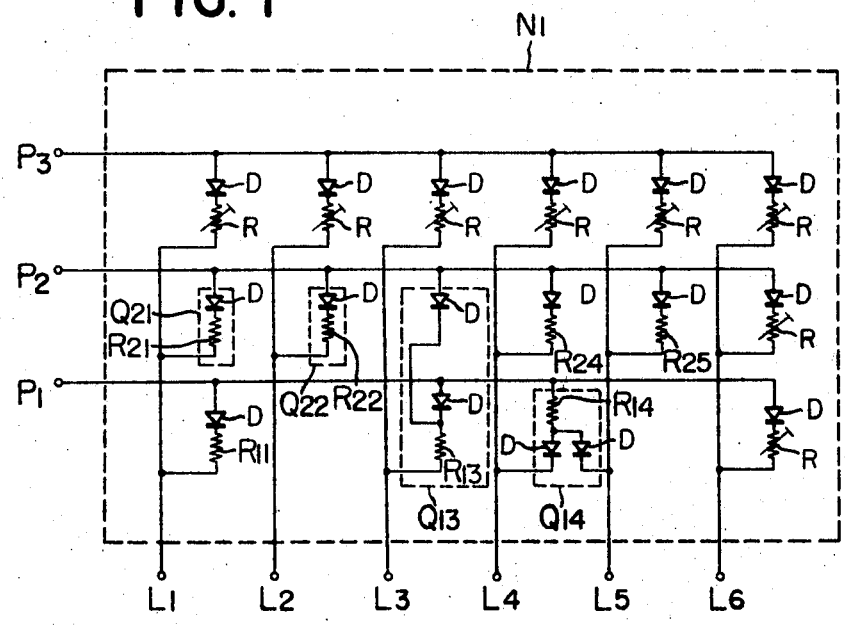
FIG. 1 is a diagram of the exposure meter sensitivity correction circuit for a first and a second embodiments of the present invention.

Description will first be made of an exposure meter sensitivity correction circuit N1 for a first and a second embodiment of the present invention. Referring to FIG. 1, an exposure meter sensitivity correction circuit generally indicated by N1 includes a plurality of terminals L1, L2, L3, L4, L5 and L6 for interchangeable lenses to be mounted in the mount portion of a camera body (FIGS. 5 and 6), and a plurality of terminals P1, P2 and P3 for focusing plates and disposed adjacent the focusing plate mount portion of the camera body (FIG. 7). Rectifiers such as diodes D or the like are inserted for passing current only in the direction from terminals P1-P3 to terminals L1-L6. Semi-fixed resistors R are connected with some of the diodes D, while fixed resistors R11-R25 are connected with the other diodes D. Thus, for example, there is formed a circuit Q21 having the resistance value (circuit constant) of the resistor R21. P1 is a terminal specific for a focusing plate having a first characteristic (hereinafter referred to as "focusing plate of the first type"), P2 is a terminal specific for a focusing plate having a second characteristic (hereinafter referred to as "focusing plate of the second type"), L1 is a terminal specific for an interchangeable lens having a first characteristic (hereinafter referred to as "interchangeable lens of the first type"), L2 is a terminal specific for an interchangeable lens having a second characteristic (hereinafter referred to as "interchangeable lens of the second type"), and L3 to L5 are terminals specific for interchangeable lenses having third to fifth characteristics respectively (hereinafter referred to as "interchangeable lenses of the third to fifth characteristics.")

The circuit is so arranged that the amount of exposure meter sensitivity correction is represented by the resistance value of a particular resistor for a particular combination of focusing plate and interchangeable lens. More specifically, when the focusing plate of the first type is combined with the interchangeable lens of the first type, the amount of exposure meter sensitivity correction is represented by the resistance value of the resistor R11. Similarly, when the focusing plate of the first type is combined with the interchangeable lens of the third type, the amount of exposure meter sensitivity correction is represented by the resistance value of the resistor R13, and when the same focusing plate is combined with the interchangeable lens of the fourth or fifth type, the amount of such correction is represented by the resistance value of the resistor R14. When the focusing plate of the second type is combined with the interchangeable lens of the first, second, third, fourth or fifth type, the amount of exposure meter sensitivity correction is represented by the resistance value of the resistor R21, R22, R13, R24 or R25, respectively. Terminals P3 and L6 serve as auxiliary contacts in the cases where a focusing plate of a further different type or an interchangeable lens of a further different type is added, and for this purpose all the semi-fixed resistors R are set in insulated condition. If a new focusing plate or a new lens is added to any commercially available camera, the semi-fixed resistors R may be set to a suitable resistance value.

In the shown exposure meter sensitivity correction circuit, when terminals P2 and L1 are selected, the circuit Q21 alone will become effective so that the resistance value (circuit constant) of the resistor R21 represents the amount of correction. When the terminal L2 is selected with the focusing plate unchanged and the interchangeable lens alone changed, the circuit Q22 of the resistor R22 will become effective. When terminals P1 and L2 are selected, the circuit is rendered nonconductive and this state is maintained in the case of inappropriate combination of focusing plate and interchangeable lens for exposure measurement. The combinations of terminal P2 with terminal L3 and terminal P1 with terminal L3 mean the case where a single common resistor R13 is only required if the circuit is arranged as shown by Q13. Further combinations of terminal P1 with terminal L4 and terminal P1 with terminal L5 also mean the case where a single common resistor R14 is only required if the circuit is arranged as shown by Q14.

It will thus be seen in the exposure meter sensitivity correction circuit of FIG. 1 that if one focusing plate terminal is selected for focusing plates of the same characteristic and in combination therewith one interchangeable lens terminal is selected for lenses of the same characteristic, then the correction resistance value (circuit constant) determined by the combination of focusing plate and interchangeable lens may be obtained between the contacts for respective interchangeable lenses and the contacts for respective focusing plates.

Figure 2:
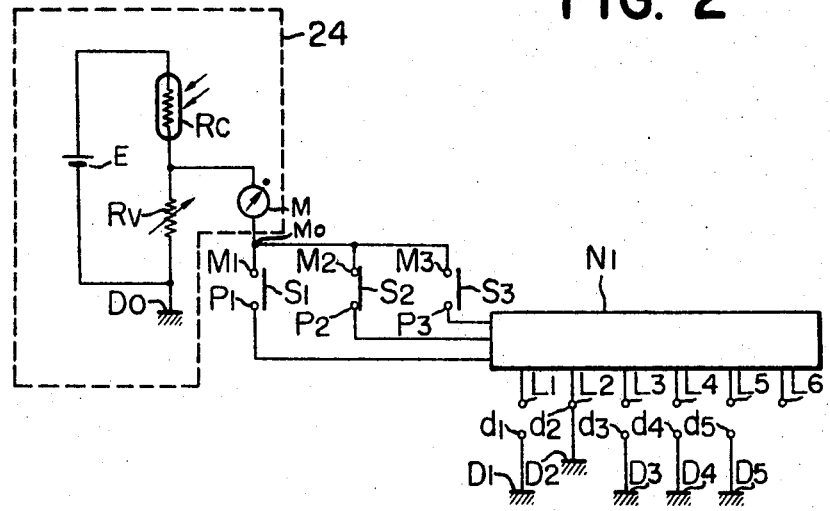
FIG. 2 is a combined circuit diagram showing the exposure meter circuit and exposure meter sensitivity correction circuit according to the first embodiment of the present invention.

A first embodiment of the present invention will now be described in full detail. Referring to FIG. 2, there is shown the relationship between the exposure meter circuit 24 and the exposure meter sensitivity correction circuit N1 according to the first embodiment. A power source E such as battery is connected with a CdS cell Rc having a substantially constant gamma as light receiving cell, which is in turn connected with a variable resistor Rv responsive to exposure factors such as film sensitivity, preset stopping value, shutter time, etc. A fix type meter M whose needle is coincident with marking for a predetermined current is connected between the CdS cell Rc and the variable resistor Rv. The meter M is connected with exposure meter correction circuit terminals M1, M2 and M3 which correspond to the focusing plate terminals P1, P2 and P3 respectively. The circuit is grounded at a body earth Do. The resistance values between the terminals M1, M2, M3 and the body earth Do are greater to a certain degree than the resistance values of CdS cell Rc and variable resistor Rv. Signal members S1, S2 and S3 are provided on focusing plate to connect a particular one of the sets of terminals M1–P1, M2–P2 and M3–P3 in accordance with the type of the focusing plate when it is mounted. In FIG. 2, the signal member S2 is shown closed to connect the correction circuit terminal M2 with the focusing plate terminal P2 while the other signal members S1 and S3 are shown open. Lens barrels for lenses of various types are adapted to be grounded at D1, D2, D3, D4 and D5.

Lens signal members d1, d2, d3, d5 and d5 provided on the interchangeable lenses select the interchangeable lens terminals L1, L2, L3, L4 and L5 respectively when the interchangeable lens is mounted on the camera body. A particular interchangeable lens terminal selected upon mounting of a lens is connected with the correction circuit grounding terminal Do via a corresponding lens tube grounding terminal. In the shown example, the interchangeable lens corresponding to the lens barrel earth D2 is mounted to connect the terminal d2 with the terminal L2, and accordingly the lens barrel earth D2 and the body earth Do are short-circuited through the lens mount, so that the terminal L2 is connected with the body earth Do. In this case, the circuit Q22 of FIG. 1 is selected and connected with a result that the resistor R22 is inserted between the correction circuit terminal M2 and the body earth Do. The resistance value (circuit constant) of the resistor R22 is selected so as to correct any error of exposure measurement which may arise for the combination of a focusing plate represented by the signal member S2 (i.e. the focusing plate of the second type) and an interchangeable lens corresponding to the lens tube earth D2 (i.e. the interchangeable lens of the second type), and thereby to vary the sensitivity of the exposure meter circuit 24 and indicate a proper exposure.

FIG. 8 shows, in perspective view, a focusing plate 4 supported by a frame 12. A focusing plate signal member S1, S2 or S3 is attached to the frame 12 by means of an insulator 24' so as to short-circuit one of the sets of the correction circuit terminals M1, M2, M3 and focusing plate terminals P1, P2, P3 mounted on the camera body, in accordance with the type of the focusing plate 4. In FIG. 8, the focusing plate 4 is shown as the second type having the signal member S2 for short-circuiting the set of terminals M2 and P2. Focusing plate signal members S1 and S3 (not shown) are of the similar construction to S2.

Referring to FIG. 7, there is shown in partly cross-sectional side view a camera body having an interchangeable lens and focusing plate mounted thereon. F denotes a film plane within the camera. A CdS cell 1 having a constant gamma is attached to a penta prism 2 adjacent an ocular 3. Below the penta prism 2 there is disposed a focusing plate 4, and a mirror 5 is disposed at an angle with respect to the focusing plate 4. Forwardly of the camera, there is mounted an objective lens 6 including a diaphragm 6a. Thus, there is provided a known photometric system whereby light is transmitted through the lens 6 to the mirror 5 which directs the light through the focusing plate 4 into the penta prism 2, through which the light is transmitted so as to be received by the CdS cell 1. The focusing plate 4 is supported by the frame 12 as described with respect to FIG. 8, and the frame 12 with the focusing plate 4 is removable by drawing it rightwardly as viewed in FIG. 7. An aperture ring 8 and a mount portion 14 having a bayonet 15 are provided on a lens barrel 13 having the lens 6, and a fork 9 for transmitting a preset stopping value to the camera body is attached to the aperture ring 8. The fork 9 is engaged with a pin 10 on an interlocking ring 7 of the camera body upon mounting of the interchangeable lens. Such engagement is required to take place in the full open photometric system as shown, but it is unnecessary in the stop-down photometry system.

The various terminals M1, P1, M2, P2, M3 and P3 of FIG. 8 are positioned within the camera body as shown in FIG. 7. In the mount portion 11 of the camera body there are embedded terminals L1 to L6 while insulated by insulator 17 with respect to the camera body. Each of these terminals L1 to L6 is supported by a resilient support member 18 and projected a predetermined distance from the mount surface. FIG. 7 shows, in cross section, the interchangeable lens terminal L1, the correction circuit terminal M2, the focusing plate terminal P2 and the focusing plate signal member S2.

FIG. 6 is a front view of the camera mount portion and illustrates an example of the positions taken by the terminals L1 to L6 on the mount.

FIG. 5 is a rear view of the interchangeable lens of the second type using the terminal L2.

Referring to FIG. 5 and FIG. 6, the points of the mount corresponding to the various interchangeable lens terminals L1 to L6 are recessed as shown by 19, 20, 21, 22 and 23, excepting for the lens signal member d2 contacting the terminal L2 to be grounded upon lens mounting. When the lens is mounted, as shown in FIG. 7, the terminals L1, L3, L4, L5 and L6 are opposed but spaced with respect to the recessed 19, 20, 21, 22 and 23 respectively. Therefore, when a lens is mounted in the manner as shown in FIG. 5, the lens signal member d2 is in contact with the interchangeable lens terminal L2 as shown in FIG. 2, so that the terminal L2 alone is grounded to the camera body. Similarly, the mounting of the lens of the first, third, fourth, or fifth type causes contact only between the respective lens signal member d1, d3, d4 or d5 and the corresponding lens terminal L1, L3, L4 or L5.

With the described arrangement, if the mounted focusing plate is of the second type, the signal member S2 attached to the frame 12 of that focusing plate connects the correction circuit terminal M2 with the focusing plate terminal P2. When an interchangeable lens of the second type is then mounted on the camera, the lens signal member d2 of that lens contacts only the terminal L2 among the lens terminals L1 to L6. As the result, the circuit Q22 in the exposure meter sensitivity correction circuit N1 of FIG. 1 is selected to provide a connection of the exposure meter circuit 24 and the exposure meter sensitivity correction circuit N1 so as to automatically correct any error of exposure measurement resulting from the combination of the second type focusing plate and the second type interchangeable lens. This also holds true of the combination of the second type focusing plate and any other type of interchangeable lens or the combination of the first type focusing plate and various types of interchangeable lens. However, in the combination of the first type focusing lens and the second type interchangeable lens (in this case, the focusing plate signal member S1 connects the correction circuit terminal M1 with the focusing plate terminal P1), the interchangeable lens terminal L2 and focusing plate terminal P1 are disconnected as seen in FIG. 2, resulting in no actuation of the exposure meter. Thus, the unavailability of such combination can be automatically known and accordingly such combination is excluded for use.

Figure 3:
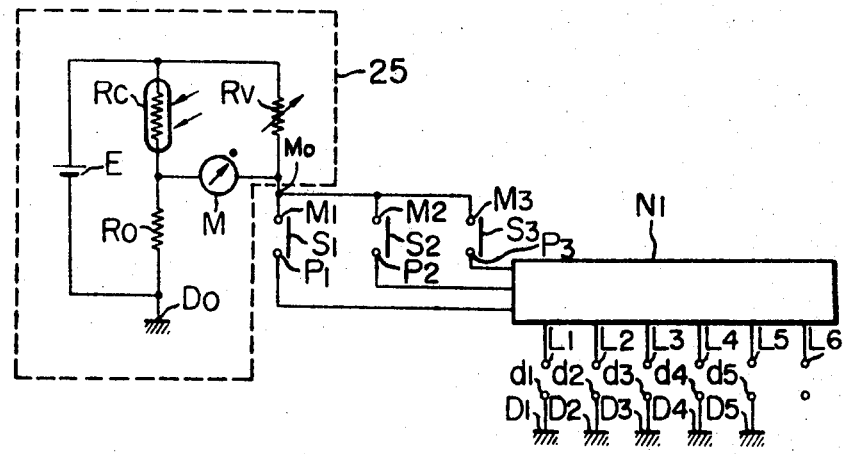
FIG. 3 is a combined circuit diagram showing the exposure meter circuit and exposure meter sensitivity correction circuit according to the second embodiment of the present invention.

A second embodiment of the present invention will now be described. This alternative embodiment is related to the bridge type exposure meter circuit. Referring to FIG. 3, the bridge type exposure meter circuit 25 includes a power supply battery E, a CdS cell Rc having a substantially constant gamma as light receiver and connected with the power source E, a variable resistor Rv connected in parallel with the CdS cell Rc and responsive to the exposure factors such as film sensitivity, preset stopping value, shutter time, etc., a fixed resistor Ro connected in series with Rc, a fix type meter M inserted between the CdS cell Rc and the variable resistor Rv, and a body earth Do forming one of the terminals of the exposure correction circuit. The exposure meter sensitivity correction circuit N1 combined with the exposure meter circuit 25 is of the same construction as that already described with respect to FIG. 1. All the other reference characters correspond to those used in the embodiment of FIG. 1. The embodiment now under discussion is so arranged that the exposure meter sensitivity is corrected by the resistance value selected and connected between the body earth Do (a correction circuit terminal) and the other correction circuit terminals M1, M2 or M3. The second embodiment is the same in operation as the first embodiment.

Figure 4:
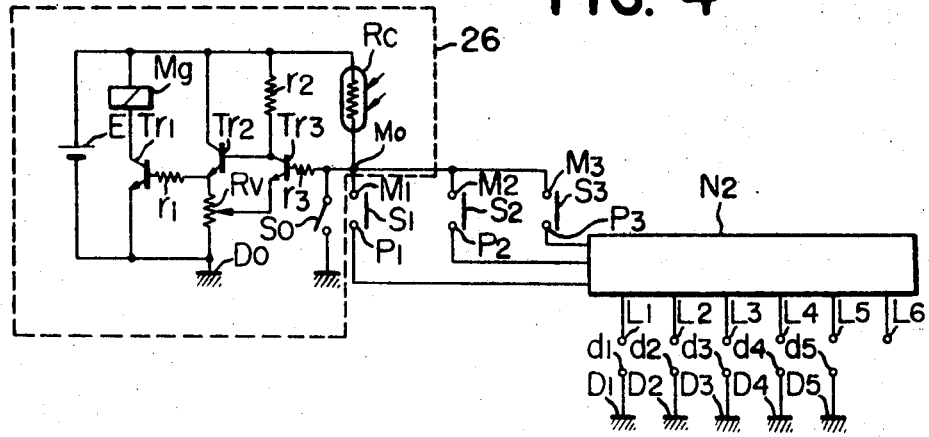
FIG. 4 is a combined circuit diagram showing the exposure meter circuit and exposure meter sensitivity correction circuit according to a third embodiment of the present invention.

A third embodiment of the present invention is shown in FIG. 4, wherein the exposure meter circuit is provided by an electric automatic exposure shutter circuit 26. The circuit 26 includes a power supply battery E, a CdS cell Rc serving as light receiver, a magnet Mg, transistors Tr1, Tr2, and Tr3, fixed resistors r1, r2 and r3, a variable resistor Rv responsive to exposure factors such as film sensitivity, stopping value, etc., a body earth Do (one of the correction circuit terminals), and a capacitor terminal short-circuiting switch So. An exposure meter sensitivity correction circuit N2, which is shown in greater detail in FIG. 9, uses capacitors and semi-fixed capacitors instead of resistors and semi-fixed resistors employed in FIG. 1. All the other reference characters correspond to those in the first embodiment.

The exposure meter sensitivity correction circuit N2 will now be described in detail with reference to FIG. 9. Rectifiers D are provided to pass current only in the direction from focusing plate terminals P1–P3 to interchangeable lens terminals L1–L6. Semi-fixed capacitors C and fixed capacitors C11–C25 are also inserted. The circuit is so arranged that the amount of exposure meter sensitivity correction is represented by the capacitance value of a particular capacitor for a particular combination of focusing plate and interchangeable lens. More specifically, when the focusing plate of the first type (i.e. terminal P1) is combined with the interchangeable lens of the first, third, fourth or fifth type (i.e. terminal L1, L3, L4 or L5), the amount of exposure meter sensitivity correction is represented by the capacitance of the capacitor C11, C13 or C14. When the combination is between the focusing plate of the second type (i.e. terminal P2) and the interchangeable lens of the first, second, third, fourth or fifth type (i.e. terminal L1, L2, L3, L4 or L5), the amount of such correction is represented by the capacitance of the capacitor C21, C22, C13, C24 or C25. In this instance, a circuit Q21, for example, has the capacitance value (circuit constant) of the capacitor C21 as was previously noted with respect to FIG. 1. The present embodiment is also the same as the FIG. 1 embodiment in that terminals P3 and L6 are meant to serve as auxiliary contacts in the case where a focusing plate or an interchangeable lens of a further different type is added. In such a case, the semi-fixed capacitors C may be set to a suitable capacitance value.

Figure 9:
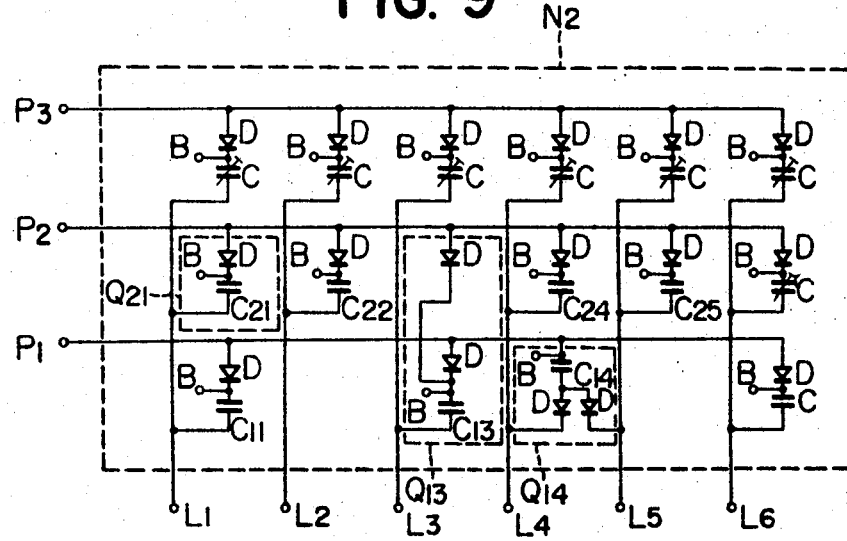
FIG. 9 is a diagram of the exposure meter sensitivity correction circuit according to the third embodiment of the present invention.

In the exposure meter correction circuit N2 of FIG. 9, when terminals P2 and L1 are selected, the circuit Q21 alone will become effective so that the capacitance value (circuit constant) of the capacitor C21 represents the amount of correction. When the terminal L2 is selected with the focusing plate unchanged and the lens along changed, the circuit of the capacitor C22 will only become effective. When terminals P1 and L2 are selected, the circuit is rendered non-conductive and this state is maintained in the case of inappropriate combination of focusing plate and interchangeable lens for exposure measurement, as was noted with respect the first embodiment. The combinations of terminal P2 with terminal L3 and terminal P1 with terminal L3 mean the case where a single common capacitor C13 is only required if the circuit is arranged as shown by Q13. Further combinations of terminal P1 with terminal L4 and terminal P1 with terminal L5 also mean the case where a single common capacitor C14 is only required if the circuit is arranged as shown by Q14.

It will thus be seen in the exposure meter sensitivity correction circuit N2 of FIG. 9 that if one focusing plate terminal is selected for focusing plates of the same characteristic and in combination therewith one interchangeable lens terminal is selected for interchangeable lenses of the same characteristic, then the correction capacitance value (circuit constant) determined by the combination of focusing plate and interchangeable lens may be obtained between the selected terminals. In the instant embodiment, before an exposure process is followed by a next exposure process, the opposite terminals of capacitors must be once short-circuited to effect discharge usually with the aid of switch So, and this may be accomplished by arranging all the individual terminals B so as to be grounded to the camera body usually in synchronism with the closing of the switch So. The above-described third embodiment is the same in operation as the first embodiment.

The above-mentioned inappropriate combination of lens and focusing plate for the purpose of photometry or as a view finder takes place, for example, in the case of the so-called clear type focusing plate (i.e. a focusing plate without mat surface) which is so designed that the light beam passing through the focusing plate may be incident upon an eye point and light receiving means disposed on both sides thereof only when the lens in use has a particular exit pupil position and the size of the exit pupil position and the size of the exit pupil is greater than a certain value. With such a focusing plate, photometry can be achieved by effecting a correction inherent to the combination thereof with a lens if the exit pupil of the objective lens is at a predetermined position or near and the size of the exit pupil is at a predetermined level. However, when the lens in use has its exit pupil substantially remote from the predetermined position or when the size of the exit pupil is too small although its position is in the neighborhood of the predetermined position, the amount of light incident on light receiving surface is insufficient or the primary area in the measurement range is varied, with a result that the focusing plate of the aforesaid type is unsuitable for photometry although it may be barely available as a view finder.

Figure 10:
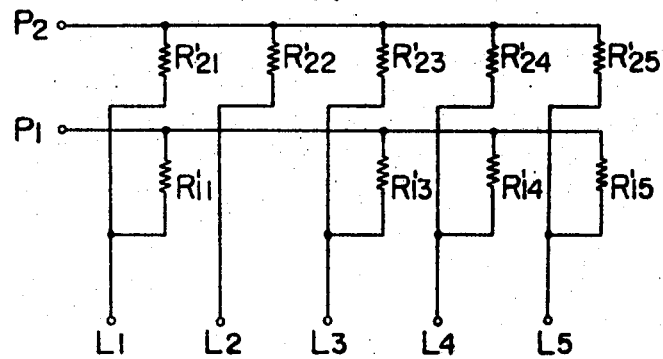
FIG. 10 is a diagram showing a modification of the FIG. 1 embodiment.

In case where the auxiliary terminals such as those designated as P3 and L6 are unnecessary, it is possible to eliminate them and all the resistors R and rectifiers D in the embodiment of FIG. 1. Thus, by arranging the circuit as shown in FIG. 10, the resistance value $r11$ (circuit constant) between terminals P1 and L1 may be determined by $R'11$ together with $R'13$, $R'14$, $R'15$, $R'23$, $R'24$, $R'25$ and $R'21$, as follows:

$$r11^{-1} = R'11^{-1} + [\{(R'13+R'23)^{-1} + (R'14+R'24)^{-1} + (R'15+R'25)^{-1}\}^{-1} + R'21]^{-1}$$

Figure 11:
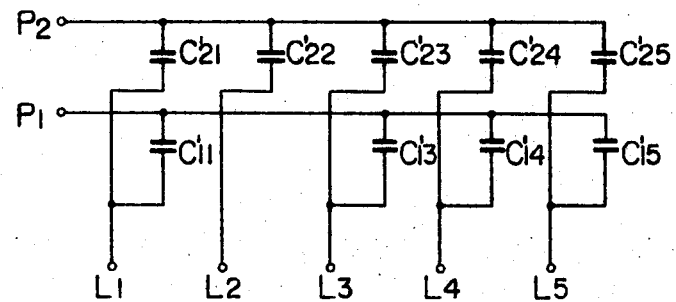
FIG. 11 is a diagram showing a further modification of the FIG. 10 embodiment.

Similarly, the resistance values $R'11$, $R'13$, $R'14$, $R'15$, $R'21$, $R'22$, $R'23$, $R'24$, and $R'25$ are computed so that the other circuit constants between P1 and L2, P1 and L3, P1 and L4, and so on may be satisfied. D's as shown in FIG. 1 may be added to the respective resistance values. And this is true of the FIG. 9 embodiment. If the auxiliary terminals P3 and L6 are unnecessary, the circuit constants between P1 and L1, P1 and and so on are set to predetermined values even if terminals P3 and L6 and all C's and D's in FIG. 9 are omitted as shown in FIG. 11 or if some of Ds and Bs are left for combination in the circuit. In such cases, $C'11$, $C'13$ and so on are capacitors of which capacitance values as the circuit constants between P1 and L1, P1 and L3 and so on have been determined so as to agree with required values.

Figure 12:
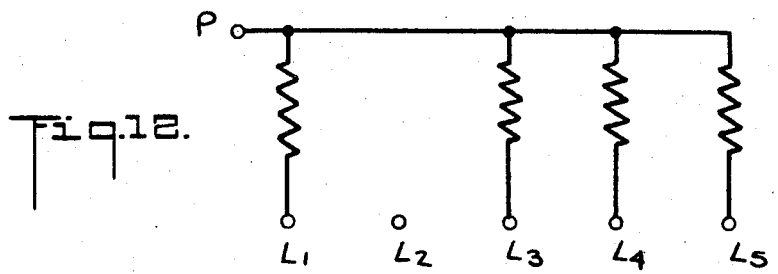
FIGS. 12 and 13 diagrammatically show correction circuits applicable to a camera of the type in which the objective lens alone is interchangeable but the focusing plate is not so.
Figure 13:
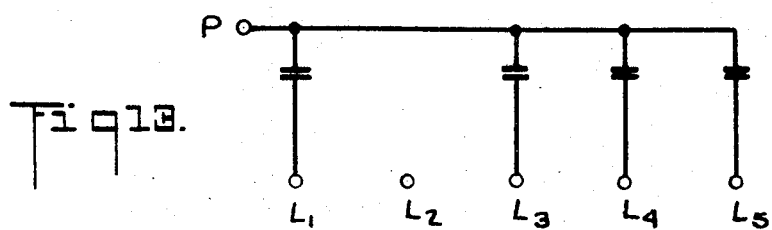

FIGS. 12 and 13 show embodiments in which the focusing plate is not replaced but the objective lens alone is replaced.

Figure 14:
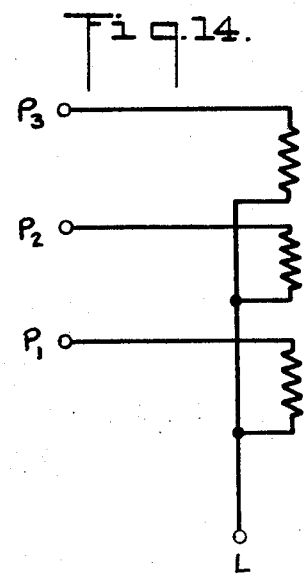
FIGS. 14 and 15 diagrammatically show correction circuits applicable to a camera of the type in which the focusing plate alone is interchangeable but the objective lens is not so.
Figure 15:
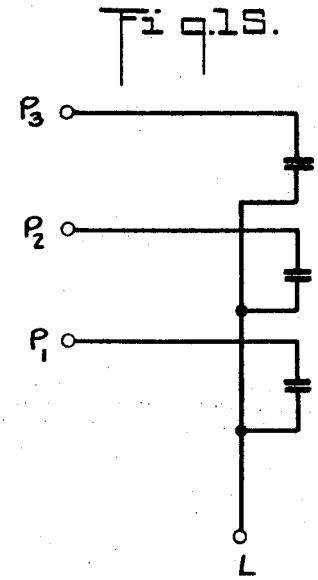

FIGS. 14 and 15 show embodiments in which the objective lens is not replaced but the focusing plate alone is replaced.

It will be appreciated from the foregoing discussion that the present invention enables interchangeable members such as objective lens, focusing plate, etc. to be replaced individually or together so that the variation in the amount of light incident on the light receiving surface which may result from such replacement may be corrected by a simple structure and simple operation as well as by using a small space.

Further, when the combination of objective lens and focusing plate is such that the performance and accuracy of the correction device cannot be ensured, the correction circuit for such combination may be rendered non-conductive to thereby disable the device and thus automatically preclude the use thereof.

Furthermore, where the arrangement of the main circuit is predetermined so that it is properly operable only when a particular interchangeable lens or a particular focusing plate is mounted on the camera, the correction means in the correction circuit for such lens or focusing plate may be simply provided by electrically good conductors instead of resistors.

What is claimed is:

1. A single-lens reflex camera provided with an interchangeable lens, an interchangeable focusing screen and an exposure-measuring device which measures the intensity of the light passing through the interchangeable lens and focusing screen, comprising:
   1. two electrical terminals disposed in a circuit of the exposure-measuring device,
   2. terminal means for the focusing screen, composed of a plurality of pairs of terminals disposed on the focusing screen-mounting portion of the camera-body, on which the interchangeable focusing screen is mounted,
      one terminal of each pair being electrically connected with one of the two electrical terminals in the circuit, and the number of pairs being equal to that of the focusing screens to be used,
   3. a first electrical contact disposed on the focusing screen for connection with one pair of the plurality of pairs,
      the first electrical contact of each focusing screen being disposed at a different position with respect to the first electrical contacts of other focusing screens, to select one pair of the plurality of pairs corresponding to the focusing screen mounted on the camera-body and to electrically connect the selected pair of terminals when the focusing screen is mounted on the focusing screen-mounting portion,
   4. electrical terminals for the interchangeable lens disposed on the lens-mounting portion of the camera-body,
      the number of the electrical terminals for the lens being equal to that of the interchangeable lenses to be used,
   5. a second electrical contact disposed on the interchangeable lens for connection with one of the electrical terminals for the interchangeable lens and the other of the two terminals in the circuit,
      the second electrical contact of each interchangeable lens being disposed at a different position with respect to the second electrical contacts of other interchangeable lenses, to select one of the electrical terminals for the interchangeable lens corresponding to the interchangeable lens mounted on the camera-body and to electrically connect said selected terminal for the lens with the other of the two terminals in the exposure-meter circuit when the interchangeable lens is mounted on the portion of the camera-body, and 6. circuit constants disposed on the camera-body,
    each circuit constant being electrically connected with one terminal of the pair selected by the mounting of the focusing screen on the camera-body and with the electrical terminal for the interchangeable lens selected by the mounting of the lens on the camera-body, and having a value corresponding to the sum of the optical characteristics of the focusing screen and the interchangeable lens mounted on the camera-body, whereby a circuit constant having the value, which corresponds to the total optical characteristics of the mounted interchangeable lens and the focusing screen, is electrically connected into the circuit of the exposure-measuring device through the two electrical terminals therein when the interchangeable lens and the focusing screen are mounted on the camera-body.

2. A single-lens reflex camera as claimed in claim 1, wherein the other of the two electrical terminals, disposed on the circuit of the exposure-measuring device, is electrically connected with the lens-mounting portion which is electrically conductive,
    said electrical terminals for the interchangeable lens is insulated from said conductive lens-mounting portion
    and said second electrical contact is disposed on the conductive portion of the interchangeable lens,
    said conductive portion being engaged with said conductive lens-mounting portion by the mounting of the interchangeable lens on the camera-body,
    whereby one of the electrical terminals for the lens is electrically connected with the other of the two terminals in the circuit through said conductive portion of the lens and the conductive lens-mounting portion of the camera-body when the interchangeable lens is mounted on the camera-body.

3. A single-lens reflex camera as claimed in claim 1, further comprising
    rectifiers, each of which is electrically connected with each of said circuit constants, to permit each of the circuit constants to act independently of the other circuit constants.

* * * * *